Aug. 15, 1961  K. M. HERGENROTHER  2,996,456
METHOD OF GROWING SILICON CARBIDE CRYSTALS
Filed Sept. 8, 1958
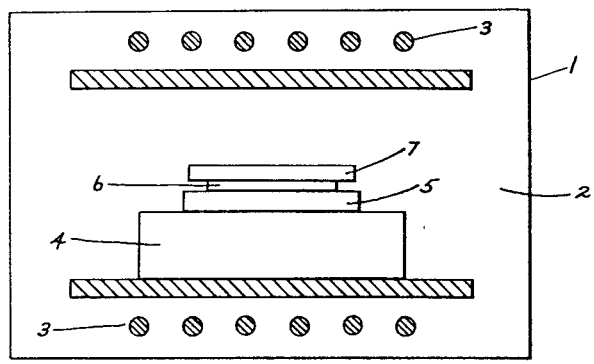
INVENTOR.
Karl M. Hergenrother
BY
Ezekiel Wolf, Wolf & Greenfield
his attorney

United States Patent Office 2,996,456
Patented Aug. 15, 1961

2,996,456
METHOD OF GROWING SILICON
CARBIDE CRYSTALS
Karl M. Hergenrother, Burlington, Mass., assignor, by mesne assignments, to Transitron Electronic Corporation, Wakefield, Del.
Filed Sept. 8, 1958, Ser. No. 760,287
14 Claims. (Cl. 252—62.3)

The present invention relates to a method of growing silicon carbide crystals.

It has been found that silicon carbide crystals have utility as a component in semi-conductor devices. Such silicon carbide crystals must be grown in a controlled manner in order that their composition be precisely determined. Thus, it is the purpose of the present invention to provide a method for growing silicon carbide crystals which are substantially free from impurities which may alter the electrical characteristics of the crystals.

It is also an object of the present invention to provide a method for growing silicon carbide crystals containing selected and precise amounts of impurities which are designed to alter the electrical characteristics of the crystals in a known and predetemined manner.

It is further an object of this invention to provide a method for growing silicon carbide crystals in a controlled fashion in a manner which is adaptable for commercial exploitation.

These and other objects of the present invention will be more clearly understood when considered in conjunction with the drawing which is a schematic illustration used in conjunction with a description of one specific embodiment of the present invention.

In the present invention, pure silicon carbide crystals or crystals having unknown or undesirable impurities are melted in a suitable solvent. Chromium and silicon have been found to be such suitable solvents. The silicon carbide is then regrown as a crystal from this melt by one of several methods. In one method a seed of silicon carbide is withdrawn from the melt, allowing the silicon carbide melt to regrow upon it in a pure or substantially controlled form. In a second method the melt of silicon carbide and a solvent as chromium is formed as a zone in a sandwich of silicon carbide materials with the sandwich having a temperature gradient established across it. The zone will then pass through the sandwich, regrowing the silicon carbide crystals on one side in substantially pure or controlled form. It has been found that chromium is particularly well suited for such a process since silicon carbide crystals are highly soluble in molten chromium. Moreover, there is some evidence that silicon carbide contains at times excess silicon or carbon and that chromium will act as a getter for such silicon and carbon and thereby will allow only stoichiometric silicon carbide crystals to be formed.

In a preferred embodiment of this invention, a zone of chromium or silicon may be passed through a silicon carbide plate by sandwiching a piece of the element between two pieces of silicon carbide. The element is then melted by establishing a temperature gradient through the sandwich at a temperature sufficient to melt the element. The element, of either chromium or silicon, for example, then passes out in the direction of the greater temperature leaving behind a single crystal silicon carbide. It will be noted in this arrangement as in the others that the chromium or silicon merely acts as a solvent for the silicon carbide with the silicon carbide being regrown from the melt as a purified crystal, or as a crystal having selected impurities.

In one specific embodiment of this invention, the method may be practiced by using an arrangement such as illustrated in the drawing. In this arrangement a sandwich is formed of two layers of silicon carbide crystal slices of approximately 15 mils in thickness with a layer of chromium 6, two mils in thickness, between them. The silicon carbide layers 5 and 7 may be both of the P type. This sandwich is positioned upon a carbon block 4 in turn supported within the RF heating coils 3. The entire construction is positioned within enclosure 1 containing an inert atmosphere such as helium. Since the carbon block alone is heated by the RF coil when the coil is energized, a temperature gradient will be established through the sandwich with the higher temperature at the bottom. The sandwich is then heated for a period of two hours with the temperature on the block measuring substantially 1820° C. The chromium 6 will then melt forming a liquid zone which migrates downwardly through the silicon carbide layer 5. This silicon carbide layer 5 regrows adjacent to the layer 7. In an experiment conducted, it was found that while the silicon carbide which dissolved was P type, the silicon carbide which was regrown was N type.

While the description of this modification of the invention utilizes specific parameters, it has been found that there is a wide variation of variables. Thus, for example, the silicon carbide may range from .005 to .020 of an inch in thickness while the chromium may vary from ½ to .005 of an inch in thickness with a thickness of perhaps .002 or .003 of an inch being preferred. The thicknesses are limited only by the edge effects on the sandwich. Further, the length of time the sandwich may be heated is determined by the amount of passing desired. Three or four thousandths of an inch has been found to be a sufficient amount of zone passing for most purposes.

While the specific embodiment described above relates to the zone passing of chromium through silicon carbide layers where both have P type characteristics, a zone of chromium may be passed through silicon carbide layers where both layers have N type characteristics or one layer has N type characteristics and the other has P type characteristics.

In another specific experiment conducted using substantially the same arrangement shown in the drawing a sandwich was heated using two layers of silicon carbide with an intermediate layer of chromium. The silicon carbide layer on the hotter side of the sandwich was of the N type variety while that of the cooler side was of the P type variety. The block was heated to a measured temperature of 1850° C. for one hour. The chromium layer of approximately 2 mils thickness migrated into the N type silicon carbide a distance of approximately 8 mils, depositing behind it a regrown silicon carbide of N type material.

A further modification of the invention utilizing the arrangement substantially shown in the drawing contemplates the utilization of impurities from the third or fifth column of the periodic table, with these impurities adapted to vary the characteristics of the silicon carbide crystals being regrown. In one specific example, using the drawing as illustrative, a pair of silicon carbide layers approximately 15 mils in thickness, as indicated at 5 and 7, were sandwiched about a chromium layer about 2 mils in thickness, as indicated at 6. This chromium layer was previously doped with a few percent by weight of boron, a P type impurity. Both layer 5 and layer 7 were N type silicon carbide. The carbon block was heated in an atmosphere of helium to approximately 1850° C. for a period of two hours. The chromium had thereupon moved through layer 5 and redeposited a layer of silicon carbide adjacent to the layer 7. The resultant structure upon cooling disclosed that the redeposited layer of silicon carbide adjacent to the layer 7 was of the P type variety.

A further modification of the invention utilizing the arrangement substantially shown in the drawing contemplates the utilization of silicon as a solvent for silicon carbide. In one specific example, using the drawing as illustrative, a pair of silicon carbide layers approximately 15 mils in thickness, as indicated at 5 and 7, were sandwiched about a silicon layer of approximately 2 mils in thickness, as indicated at 6. The sandwich was heated in an atmosphere of helium to approxmately 1700°–1750° C. for a period of three hours. The silicon thereupon passed a few mils into the P type silicon carbide and redeposited a silicon carbide crystal adjacent the layer 7.

A further modification of the invention utilizing the arrangement shown in the drawing contemplates the use of chromium which is saturated with pure silicon carbide. This modification causes the silicon carbide which is first redeposited to be of a very high resistivity. This modification also makes possible the use of high purity silicon carbide even though it is finely divided. In one specific example, using the drawing as illustrative, a pair of silicon carbide layers of approximately 15 mils in thickness, as indicated at 5 and 7, were sandwiched about a chromium layer about 2 mils in thickness as indicated at 6. This chromium was previously melted and saturated with pure finely divided silicon carbide. The layer 5 of silicon carbide was P type while the layer 7 was N type. The carbon block was heated to approximately 1850° C. for a period of two hours. The chromium thereupon passed through the silicon carbide layer 5 which was redeposited in a layer adjacent to layer 7. The resultant structure upon cooling disclosed a redeposited layer of silicon carbide adjacent the layer 7 to be high resistivity P type. Diodes made by this process support reverse voltages of 500 volts and retained their diode properties at 500° C.

Also contemplated is the saturation of silicon with pure silicon carbide for use in a method as just described. As silicon carbide is much more soluble in chromium than silicon, the redeposited layer of pure silicon carbide is much thicker when saturated chromium is used. Thus the layer of pure high resistivity silicon carbide obtained by the use of saturated silicon in this process is too thin for many purposes.

The preceding specific example discloses the use of an impurity selected from the third column of the periodic table. However, it should be understood that impurities in the fifth column of the period table, such as arsenic phosphorous or nitrogen, may be used if desired to form silicon carbide crystals having fifth column impurity. Moreover, third and fifth column impurities may be used in molten silicon in a similar process. The particular amount of impurities utilized is dependent upon the results desired.

In each of the preceding examples, the temperature gradient established should be as great as possible. This may be obtained, for example, by directly applying heat only to the side which is to be the hotter side of the sandwich, provided of course that the chromium or silicon or solvent layer does in fact melt.

Another method of practicing the present invention is to melt a quantity of chromium or silicon or other silicon carbide solvent in a crucible formed of silicon carbide. A cooled silicon carbide seed is then dipped into the melt and slowly withdrawn as silicon carbide crystallizes on the seed. In this arrangement, the crucible acts as the hotter side of the sandwich. The silicon carbide crucible dissolves and is reformed as a purified crystal on the seed. Conventional arrangements may be utilized to draw this seed from the silicon carbide crucible. In this case an atmosphere of inert gas such as helium should also be used. A specific embodiment of this particular method contemplates, for example, a silicon carbide crucible having the following dimensions:

| | Inches |
|---|---|
| Height | 2 |
| Outer width | 2 |
| Inner diameter | 1½ |

Chromium in the amount of 100 grams is deposited in the crucible. The crucible is heated to a temperature of 1800° C. maintaining the chromium as a melt. A cooled silicon carbide seed mounted on a graphite jig is then introduced into the melt and slowly withdrawn as in conventional drawing processes, with the crystal being withdrawn at the rate of approximately one inch per hour. It will be understood that this specific example is merely illustrative of the parameters contemplated.

A further embodiment of this invention contemplates melting of chromium or silicon in a suitable inert crucible. A thermal gradient is then established through the melt of chromium or silicon. A silicon carbide charge is then fed into the hotter part of the melt while a silicon carbide seed is withdrawn slowly from the cooler part of the melt as the crystal grows. In this latter arrangement, a suitable crucible contemplates one made of thoria (thorium oxide) or zirconia (zirconium oxide). Other materials non-reactive with chromium or silicon may be used. The temperature gradient established should be as great as possible with the temperature of the melt being maintained in the range of 1700°–1900° C. The rate the silicon carbide charge is fed into the hotter part of the melt and the silicon carbide seed withdrawn is determined by the speed with which the silicon carbide crystal grows.

Having now described my invention, I claim:

1. A method of growing silicon carbide crystals of precisely controlled composition comprising arranging a sandwich of three layers of material with the outer layers comprising silicon carbide and the intermediate layer a silicon carbide solvent selected from a group consisting of silicon and chromium, establishing a temperature gradient across the sandwich sufficient to melt the intermediate layer whereby said intermediate layer forms a migrating liquid zone which dissolves the silicon carbide on the hotter side and reforms it as a single crystal silicon carbide on the other side.

2. A method of growing silicon carbide crystals of precisely controlled composition comprising arranging a sandwich of three layers of material with the outer layers comprising silicon carbide and the intermediate layer consisting essentially of chromium, establishing a temperature gradient across the sandwich sufficient to melt the intermediate layer whereby said intermediate layer forms a migrating liqiud zone which dissolves the silicon carbide on the hotter side and reforms it as a single crystal silicon carbide on the other side.

3. A method of growing silicon carbide crystals of precisely controlled composition comprising arranging a sandwich of three layers of material with the outer layers comprising silicon carbide and the intermediate layer a silicon carbide solvent selected from a group consisting of silicon and chromium, establishing a temperature gradient across the sandwich with the temperature of the intermediate layer between substantially 1700° C. and 2000° C. sufficient to melt the intermediate layer whereby said intermediate layer forms a migrating liquid zone which dissolves the silicon carbide on the hotter side and reforms it as a single crystal silicon carbide on the other side.

4. In a method of controlled growing silicon carbide the steps of arranging an intermediate body of molten chromium between two bodies of silicon carbide and then establishing a heat gradient across said bodies sufficient to maintain said chromium molten.

5. In a method of controlled growing of silicon carbide the steps of arranging an intermediate body of a silicon carbide solvent selected from a group consisting of chromium and silicon between two bodies of silicon carbide, and then establishing a heat gradient across said bodies sufficient to maintain said solvent molten.

6. A method of controlled growing of silicon carbide crystals comprising placing a cooled silicon carbide seed in a melt of chromium contained in a crucible of silicon carbide and subsequently slowly withdrawing the seed from the melt while maintaining the melt whereby a temperature gradient is created between the crucible and seed and silicon carbide crystallizes on the seed.

7. A method of controlled growing of silicon carbide crystals comprising melting chromium in an inert crucible and establishing a thermal gradient through the melt, feeding a silicon carbide charge into the hotter part of the melt at a controlled slow rate and withdrawing a silicon carbide seed from the cooler part of the melt at a controlled slow rate of speed.

8. A method of controlled growing of silicon carbide crystals comprising placing a cooled silicon carbide seed in a melt of silicon contained in a crucible of silicon carbide and subsequently slowly withdrawing the seed from the melt while maintaining the melt whereby a temperature gradient is created between the crucible and seed and silicon carbide crystallizes on the seed.

9. A method of controlled growing of silicon carbide crystals comprising melting silicon in an inert crucible and establishing a thermal gradient through the melt, feeding a silicon carbide charge into the hotter part of the melt at a controlled slow rate and withdrawing a silicon carbide seed from the cooler part of the melt at a controlled slow rate of speed.

10. A method as set forth in claim 3 wherein said chromium is saturated with silicon carbide prior to arranging said sandwich.

11. In a method of growing silicon carbide crystals in a controlled manner to precisely determine the impurities and their concentration in the silicon carbide the steps comprising dissolving a silicon carbide solid in molten silicon carbide solvents selected from a group consisting of silicon and chromium which contains semiconductor doping impurities and then growing crystals from the solution.

12. In a method of growing silicon carbide crystals, the steps comprising dissolving a silicon carbide solid in molten chromium and then growing crystals from the solution.

13. In a method of growing silicon carbide crystals, the steps comprising dissolving a silicon carbide solid in molten silicon and then growing crystals from the solution.

14. In a method of controlled growing silicon carbide the steps of arranging an intermediate body of molten silicon between two bodies of silicon carbide and then applying a heat gradient between the said bodies of silicon carbide at such a level to maintain said silicon molten, the crystals of silicon carbide growing on the cooler body of silicon carbide.

References Cited in the file of this patent

UNITED STATES PATENTS

| | | |
|---|---|---|
| 2,736,847 | Barnes | Feb. 28, 1956 |
| 2,747,971 | Hein | May 29, 1956 |